Sept. 10, 1940. F. P. BOUTON Re. 21,553

FISH LURE

Original Filed Aug. 16, 1938

Inventor,

Fletcher P. Bouton,

By Frank A. Appleman

Attorney

Reissued Sept. 10, 1940

Re. 21,553

UNITED STATES PATENT OFFICE 21,553

FISH LURE

Fletcher P. Bouton, St. Petersburg, Fla.

Original No. 2,158,924, dated May 16, 1939, Serial No. 225,204, August 16, 1938. Application for reissue June 20, 1940, Serial No. 341,581

3 Claims. (Cl. 43—39)

This invention relates to artificial bait for fishing, and particularly to the type usually designated as "plugs."

It is an object of this invention to provide a lure which will be effective to prevent fouling of the hook by the accumulation of grass, weeds or the like, and furthermore to provide a lure which will attract the attention of fish as it is drawn toward the user, either on the bottom of the body of water being fished or as the said lure rises during its movement or travel; means being provided for deflecting the lure as it moves or is being pulled by fishing.

It is furthermore an object of the invention to provide a lure which will simulate a natural object such as a frog and which will have a collapsible body effective to guard the hook to prevent fouling, as stated, and yet of such a yieldable character that when struck by a fish, it will yield sufficiently to enable the point of the hook to function and penetrate the mouth of the fish.

It is a still further object of the invention to produce a lure of the character indicated which will withstand the attack, due to the striking by the fish, and which will assume its normal condition when released so that a repetition of the operation may ensue.

It is furthermore an object of the invention to provide the lure with a collapsible body having a covering or coating of tough material that will not be torn or disintegrated by the teeth of the fish; in other words, the covering will guard the collapsible portion of the lure from wear and disintegration.

It is a still further object of the invention to provide a lure of the character indicated that will be comparatively inexpensive to manufacture and one that will prove efficient and satisfactory in use.

With the foregoing and other objects in view, the invention consists in the details of construction and in the arrangement and combination of parts to be hereinafter more fully set forth and claimed.

In describing the invention in detail, reference will be had to the accompanying drawing forming part of this application, wherein like characters denote corresponding parts in the several views, and in which—

Figure 1:
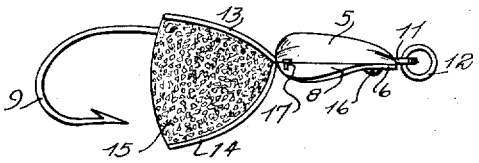
Figure 1 illustrates a view in elevation, partly in section, showing a lure embodying the invention, inverted as compared with its position in use.
Figure 2:
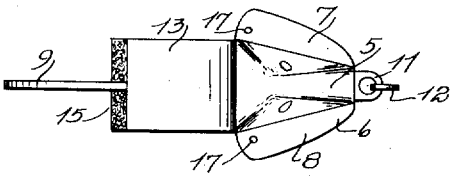
Figure 2 illustrates a bottom plan view of the lure thereof.

In the drawing 5 denotes a body member which may be made to simulate the head of a frog or the like, and it aids, when the lure is drawn through the water, in holding the lure so that the said body member 5 is below the plate 6, which plate has fins 7 and 8, the rear portions of which are shaped to form deflectors which will tend to cause the lure to rise as it is drawn through the water. A hook 9 of appropriate type has a shank 10 interposed between the body member 5 and the plate 6 and the shank end of the hook may have an eye 11 which may contain a ring or other hitch 12 to which the line may be connected.

Figure 3:
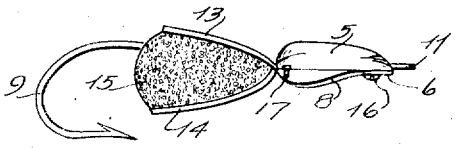
Figure 3 illustrates a view similar to Fig. 1 with the guard collapsed.

The hook guard is collapsible and preferably comprises coverings 13 and 14 of wear-resistant material of a flexible character such as rubber and a filling 15 of collapsible material such as sponge rubber which will hold the coverings approximately in the position in which they are shown in Fig. 1, the said coverings being movable to compress the filling when struck by a fish so that the parts assume approximately the position in which they are shown in Fig. 3 where the point of the hook is unguarded or exposed in order that it will penetrate the jaws or other parts of the fish's mouth. The filling 15 may be secured to the coverings in any appropriate manner as by vulcanizing or through the employment of adhesives, but the inventor does not wish to be limited with respect to the manner in which this assembly is held together.

Figure 4:
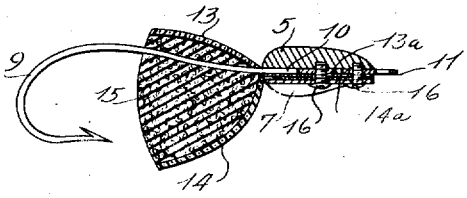
Figure 4 illustrates a sectional view through the lure on the line of the hook and its shank inverted.

As shown in Fig. 4, the coverings 13 and 14 have extensions 13*a* and 14*a*, respectively, which are superimposed between the member 5 and the plate 6, and the shank of the hook is also seated between the member and the plate, and these are held together by fastenings 16 such as screws or the like, so that a lure of strong and durable construction and of attractive appearance results. The shank of the hook may have apertures through which the fastenings 16 extend.

It is obvious that the external surfaces of the coverings may have a brilliant hue or any coating which will attract the attention of fish while the lure is in the water.

Furthermore, the lure may be sufficiently attractive without any additional elements, although if supplied with a streamer such as pork rind, feathers or the like, the requirements of some of the users thereof may be better satisfied. The streamers may be attached to studs such as 17 or other retaining devices of ordinary type.

I claim:

1. A lure comprising a member simulating a head of a natural object, a plate approximately parallel therewith having deflecting fins, guard coverings having extensions lying between the member and the plate, a hook having a shank also lying between the member and the plate, fastenings for securing the aforesaid parts together, and a guard comprising a collapsible body interposed between the coverings.

2. In a lure, a member simulating the body of an object, a plate approximately parallel therewith having fins, guard coverings having extensions lying between the member and the plate, a hook having a shank also lying between the member and the plate, means for securing the member and plate and the interposed elements together, and a collapsible guard through which the shank of the hook projects, said collapsible guard being interposed between and secured to the coverings.

3. A lure comprising a body member, a plate member lying adjacent to the body member, said plate member having a deflecting fin, a hook having a shank member lying between the body member and the plate member, fastening securing the aforesaid members together, and a guard of collapsible material through which the hook projects, said guard being interposed between the body member and the point of the hook.

FLETCHER P. BOUTON.